(12) United States Patent
Wajer et al.

(10) Patent No.: US 6,289,827 B1
(45) Date of Patent: Sep. 18, 2001

(54) PROCESS FOR THE CONTROL OF ASH ACCUMULATION AND CORROSIVITY ASSOCIATED WITH SELECTIVE CATALYTIC REDUCTION TECHNOLOGY

(75) Inventors: Mark Wajer, Nottingham, MD (US); David M. Smith, Kearneysville, WV (US)

(73) Assignee: Martin Marietta Magnesia Specialties Inc., Raleigh, NC (US)

( * ) Notice: Subject to any disclaimer, the term of this patent is extended or adjusted under 35 U.S.C. 154(b) by 0 days.

(21) Appl. No.: 09/599,529

(22) Filed: Jun. 23, 2000

Related U.S. Application Data

(60) Provisional application No. 60/140,495, filed on Jun. 24, 1999.

(51) Int. Cl.$^7$ .......................................................... F23J 3/00
(52) U.S. Cl. ........................... 110/345; 110/342; 110/203; 110/216; 422/177; 422/180
(58) Field of Search ..................... 110/343, 203, 110/216, 342, 344, 345; 422/177, 180

(56) References Cited

U.S. PATENT DOCUMENTS

| | | | |
|---|---|---|---|
| 4,245,573 | * 1/1981 | Dixit et al. | 110/343 |
| 4,246,234 | * 1/1981 | Kittrell et al. | 422/171 |
| 4,415,537 | * 11/1983 | Vine et al. | 422/180 |
| 4,616,574 | * 10/1986 | Abrams et al. | 110/343 |
| 4,735,705 | * 4/1988 | Burk et al. | 208/113 |
| 4,752,302 | * 6/1988 | Bowers et al. | 44/68 |
| 4,796,548 | * 1/1989 | Merrel et al. | 110/343 |
| 4,853,194 | * 8/1989 | Hino et al. | 423/239 |
| 4,953,481 | * 9/1990 | Clayton | 110/342 |

OTHER PUBLICATIONS

Stultz et al., "Steam, its Generation and Use", pp. 34–4–34–8, (1992).

* cited by examiner

*Primary Examiner*—Denise L. Ferensic
*Assistant Examiner*—Kenneth B. Rinehart
(74) *Attorney, Agent, or Firm*—McDermott, Will & Emery

(57) ABSTRACT

A process for the utilization and strategic addition of ash modifying compounds, into selective catalytic reduction units, to modify the resultant ash chemistry to control ash accumulation and corrosive effects of the combustion products, and problems associated with fly-ash disposal or recycling.

9 Claims, No Drawings

PROCESS FOR THE CONTROL OF ASH ACCUMULATION AND CORROSIVITY ASSOCIATED WITH SELECTIVE CATALYTIC REDUCTION TECHNOLOGY

CROSS REFERENCE TO RELATED APPLICATIONS

This application claims priority from Provisional United States application Ser. No. 60/140,495, filed Jun. 24, 1999.

FIELD OF THE INVENTION

The present invention relates to methods for the control of ash accumulation and corrosive effects of combustion products, and problems associated with fly-ash disposal or recycling, in catalytic reduction units, by addition of modifying compounds to reduce the detrimental effects of these materials.

BACKGROUND OF THE INVENTION

The EPA has recently promulgated as part of the Clean Air Act a major reduction in nitrogen oxides (NOX) emissions with compliance scheduled for May 1, 2003 in 22 eastern states and the District of Columbia. For the electrical utility industry specifically, a 75% reduction in the current permissible emission has been established which is equivalent to 0.15 lb NOX per million BTU's. The major method of compliance for the utilities will be selective catalytic reduction (SCR) as NOX reductions of 80% to 90% have been proven in Germany and Japan where these regulations have existed for fifteen years.

Predominantly, coal-fired utilities are affected by this regulation. In Europe and Asia where this technology has been employed for a long time, their coals tend to contain low sulfur (less than 1.5% $SO_2$) whereas United States coals are significantly higher in sulfur content. The level of total sulfur ranges from 1.13% total sulfur for coal from the Pittsburgh seam in Washington, Pa. to a level of 8.2% total sulfur for coal from the Bevier seam in Henry, Mo. Operation of the SCR's overseas has presented only minor problems whereas in the U.S., several problems have occurred due to the higher sulfur content.

SUMMARY OF THE INVENTION

It is accordingly an object of the present invention to provide novel methods to overcome or mitigate these problems by reducing the detrimental effects of combustion products in these industries.

A further object of the invention is to provide novel methods to overcome or mitigate problems in such catalytic reduction systems by addition of modifying compounds to the system which will modify ash chemistry so as to control ash accumulation and the corrosive effects of combustion products, the modifying compounds preferably comprising magnesium compounds.

Other object and advantages of the invention will become apparent as the description thereof proceeds.

In satisfaction of the foregoing objects and advantages, the present invention provides a method for controlling ash accumulation and corrosive effects of combustion products of catalytic reduction systems which comprises the addition of chemical compounds which will modify the resultant ash chemistry. In a preferred embodiment, the chemical compounds comprise magnesium compounds.

DESCRIPTION OF THE INVENTION

In typical SCR systems, the catalyst is placed in the colder part of the boiler usually before the air heater so that the unit is exposed to temperatures between 450° and 750° F., or otherwise supplemental heat will probably be required. The flue gas containing the nitrogen oxides flows through the honeycomb or plate catalyst in the presence of a slight deficiency of ammonia so that by means of oxidation—reduction reactions, about 85% of the nitrogen oxides are converted to diatomic nitrogen which comprises 78% of the air we breath.

In this process, two detrimental side effects occur. First, on the commercial level, about 5 ppm of ammonia does not react resulting in free ammonia. Second, the same catalyst that helps to convert the NOX into a harmless form, also catalyzes the conversion of $SO_2$ to $SO_3$. These two materials react to form ammonium sulfate $[NO_4)_2SO_4]$ and ammonium bisulfate $[NH_4HSO_4]$ which have low melting points and will cause pluggage in the air heater and are also acidic thus causing corrosion. Their melting points are 445° F. and 297° F., respectively, which means that they are molten at the typical air heater temperatures. The sulfates cause the fly-ash to adhere to the surfaces of the catalyst thus resulting in more frequent shutdowns to remove the hardened mass. Plugging of the air heater has been identified as the number one operating problem with SCR's. The costs associated only with the washing of the air heater and net loss of generating revenue is about $50,000 with each shutdown.

Another major problem area is plugging the catalyst. Either in plate or honeycomb form, the openings are only 6 to 12 mm in the ceramic catalyst. Again, compounds with low melting temperatures can fuse or cause the fly-ash to adhere to the catalytic surface.

Several compounds which cause the problems have been identified. They are sodium aluminum sulfate ($NaAlSO_4$), potassium aluminum sulfate ($KAlS_4$) and ammonium phosphate $[(NH_4)_3PO_4)]$. The sodium, potassium, aluminum and phosphorous originate from the coal and their levels are dependent on the type and source of coal. The sulfur trioxide ($SO_3$) results from oxidation of the coal ash and causes the formation of deposits on the catalyst.

For many years oil-fired furnaces have been treated with magnesium oxide suspended in oil. One of the main purposes of this treatment is for the MgO to combine with $SO_3$ to form non-corrosive magnesium sulfate and lower the exit temperature of the boiler without causing sulfuric acid to condense on the air heater. A similar problem is created by the SCR's. Both forms of ammonium sulfate will condense but in particular, the ammonium hydrogen sulfate will condense in a form which can be expressed as an acid salt containing $(NH_4)_2SO_4$ and sulfuric acid, $H_2SO_4$. In SCR's, magnesium will raise the melting point of the ash above the air heater temperature. The modified ash is more friable and can be removed by soot blowers.

The addition of magnesia will also raise the melting point of ammonium phosphate in the SCR to reduce its tendency to adhere to the catalyst surface. It may also do the same for the alkali aluminum to form spinel which is a very friable material to help prevent the formation of the alkali aluminum sulfate and also make the ash readily removable by soot blowers.

The preferred compounds of the magnesium used in this invention comprise the oxides or the hydroxides. The magnesia or other compound may be added as a powder, aqueous suspension, or oil based suspension.

The site for injection of the magnesium compound is important. From previous work on coal-fired furnaces, it was noted that if the magnesium compound is added too close to the front of the boiler (too high a temperature), the magnesium compound will react with the silica and other ingredients in the coal ash thus causing an excessive requirement for the magnesium compound. However, the injection site must be cool enough for magnesium sulfate to remain in the combined form and not disassociate back to sulfur trioxide gas and magnesia. The magnesia must be injected so as to be uniformly dispersed in the flue gas within a few seconds for proper treatment.

The amount of magnesium compound to be used will be based on the coal ash analysis. The greater the amount of impurities, the higher the amount of magnesium compound or salt addition required. In general, from 1 wt. % up to 80 wt. %, preferably 0.5 to 25 wt. % of magnesium compound or salt may be added, based on the weight % of sulfur shown in the analysis.

The addition of the magnesium compound produces a friable residue in the SCR unit and air pre-heater of a coal fired unit to allow quicker removal of the residue while also contributing to sulfur oxide gases ($SO_x$) control by reducing the formation of ammonium sulfate double salts such as ammonium magnesium sulfate $[(NH_4)_2Mg_2(SO_4)_3]$. In the air-heater section, the magnesium modifies the ash thus resulting in less pluggage due to ash build-up and also provides alkalinity to reduce corrosion of the unit. In the fly-ash, the magnesium can also reduce the impact of ammonia release when the ash is used in concrete production.

The magnesium may be supplied by an operative magnesium chemical or compound such as magnesium oxide, magnesium hydroxide, magnesium carbonate, etc. Also the form of addition can be powder injection, aqueous suspension, oil-based suspension, etc.

In addition to magnesium chemicals, the addition of about 1 to 50 wt. % aluminum chemicals combined with about 50 to 1 wt. % of the magnesium chemicals is a further embodiment of the invention. A mixture of a magnesium compound or salt with aluminum trihydrate (ATH) provides the chemical basis to form spinel type products, which have been utilized successfully in the oil-fired utilities to produce an easy-to-remove ash. These blends of magnesium and aluminum compounds would thus be of benefit to the SCR industry.

The following examples are presented to illustrate the invention. However, the invention is not considered as limited thereto as obvious variations thereon will become obvious to those skilled in the art.

EXAMPLE I

In this example, three different formulations were tested to determine the effect of magnesium hydroxide on ammonium bisulfate at temperatures of the type encountered in SCR units, and especially the effect on residues which result from cooling.

In each of tests A, B and C, different amounts of magnesium hydroxide were mixed with ammonium bisulfate to obtain different ratios. Then the mixture was heated or burned at 399° C. until the mixture was melted and then allowed to cool. Then a 2% mixture of the resulting ash was formed in 100 ml of deionized water and the pH determined. The tests were as follows:

| Test A: | 25 grams Ammonium Bisulfate |
| --- | --- |
| | 10 grams $Mg(OH)_2$ |
| | Ratio: 2 gms $Mg(OH)_2$/5 gms $NH_4HSO_4$ |
| | Resulting pH = 10.36 |
| Test B: | 25 grams Ammonium Bisulfate |
| | 15 grams $(Mg(OH)_2$ |
| | Ratio: 3 gms $Mg(OH)_2$/5 gms $NH_4HSO_4$ |
| | Resulting pH = 10.36 |
| Test C: | 25 grams Ammonium bisulfate |
| | 7.5 grams $Mg(OH)_2$ |
| | Ratio: 1.5 gms $Mg(OH)_2$/5 gms $NH_4HSO_4$ |
| | Resulting pH = 3.71 |

These experiments showed that the $Mg(OH)_2$ addition to ammonium bisulfate, one of the problem compounds in SCR units, under simulated burn conditions, resulted in an ash which could be easily removed and handled and wherein the pH had been substantially elevated above the pH of 1.28 of untreated ammonium bisulfate.

EXAMPLE II

This example was the same as Example I except that the SCR compound to be treated was ammonium sulfate. Test A, B and C compositions and pH results were as follows:

| Test A: | 25 grams Ammonium Sulfate |
| --- | --- |
| | 10 grams $Mg(OH)_2$ |
| | Ratio: 2 gms $Mg(OH)_2$/5 gms $(NH_4)_2SO_4$ |
| | Resulting pH = 9.93 |
| Test B: | 25 grams Ammonium Sulfate |
| | 15 grams $(Mg(OH)_2$ |
| | Ratio: 3 gms $Mg(OH)_2$/5 gms $(NH_4)HSO_4$ |
| | Resulting pH = 10.44 |
| Test C: | 25 grams Ammonium Sulfate |
| | 7.5 grams $Mg(OH)_2$ |
| | Ratio: 1.5 gms $Mg(OH)_2$/5 gms $(NH_4)_2SO_4$ |
| | Resulting pH = 8.71 |

The results from this example were consistent with Example I. The heated and cooled mixture was an ash with an elevated pH which could be easily handled and removed.

The invention has been described with reference to certain preferred embodiments. However, as obvious variations thereon will become apparent to those of skill in the art, the invention is not considered to be limited thereto.

What is claimed is:

1. In a method for operating a selective catalytic reduction unit containing a catalyst wherein flue gas containing nitrogen oxides and $SO_2$ flow through said catalyst in the presence of ammonia resulting in the conversion of $SO_2$ to $SO_3$, and formation of ammonium sulfate salts which are acidic and cause blockage in the unit and fly ash which adheres to the catalyst, the improvement comprising adding to said unit a magnesium compound or salt which forms magnesium sulfates and magnesium ammonium sulfate salts by reaction with $SO_3$ and ammonia, thereby modifying fly ash chemistry to control ash accumulation and the corrosive effects of combustion products, and raises the melting point and the pH of the fly ash so as to make the fly ash more friable, whereby fly ash accumulation and corrosive effects of combustion products are reduced.

2. A method according to claim 1, wherein the magnesium-containing compound or salt is selected from the group consisting of magnesium oxide, magnesium hydroxide, magnesium carbonate, or mixture thereof.

3. A method according to claim 1 wherein about 1 to 80 wt. % of said magnesium compound or salt based on the weight % of $SO_3$ shown to be present by analysis, is added to the unit.

4. A method according to claim 1, wherein addition of said magnesium compound or salt reduces the tendency of salts to adhere to the catalyst surface.

5. A method according to claim 1, wherein said unit is operated at a temperature of about 450° F. and 750° F.

6. A method according to claim 1, wherein said unit is heated by a coal which contains sulfur.

7. A method according to claim 1 wherein the magnesium compound or salt is added to said unit so as to be uniformly dispersed in the flue gas.

8. A method according to claim 1, wherein said magnesium compound or salt is added to the unit as a powder, suspension or oil based suspension.

9. A method according to claim 2, wherein magnesia is the magnesium compound added to the unit.

* * * * *